(No Model.)  4 Sheets—Sheet 1.
A. INGRAHAM.
ROLLER MILL.
No. 301,240. Patented July 1, 1884.
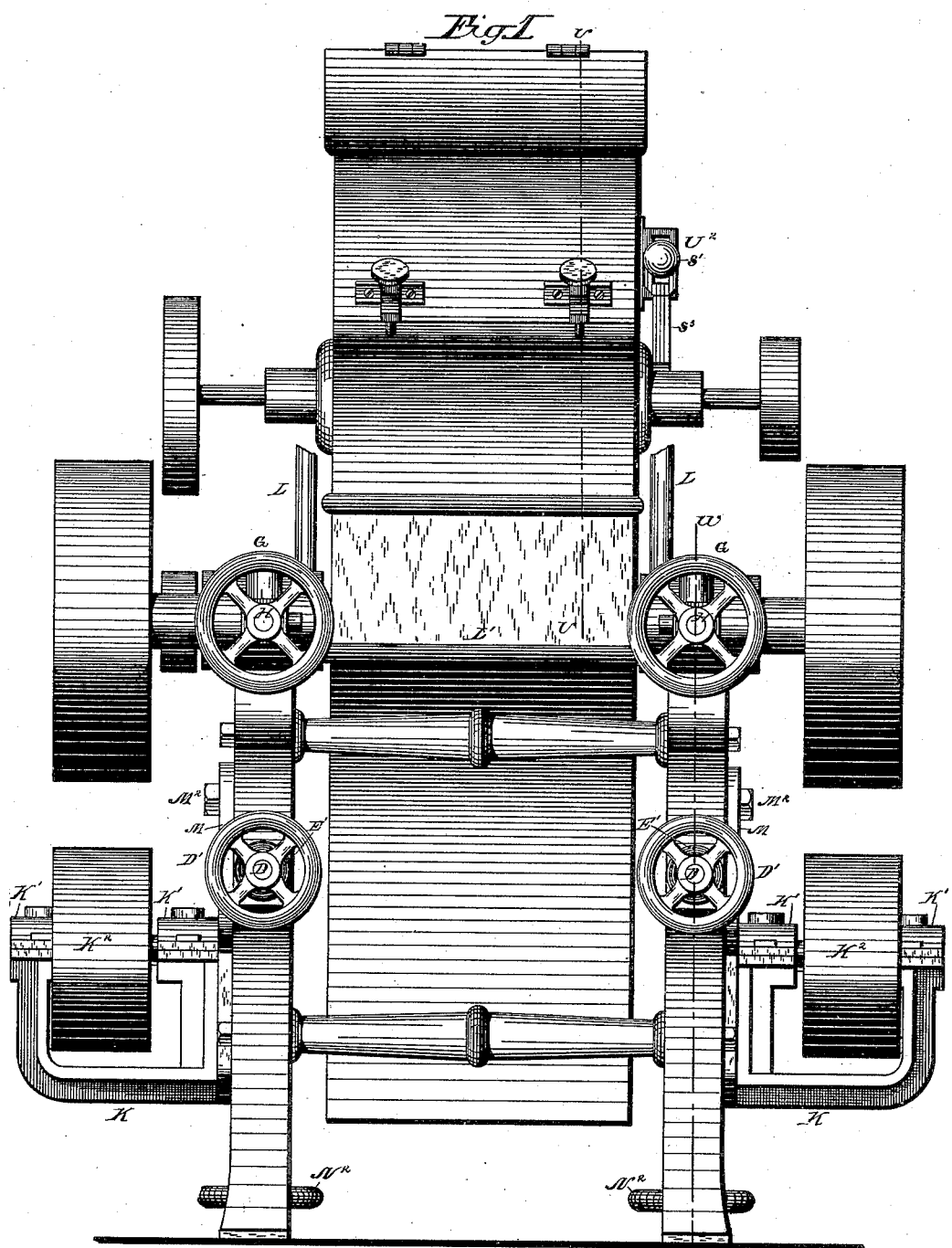
Witnesses:
C. B. Story.
J. N. Barber.
D. H. Dorman
Inventor:
Alexander Ingraham
By,
J. T. Cameron,
Attorney.

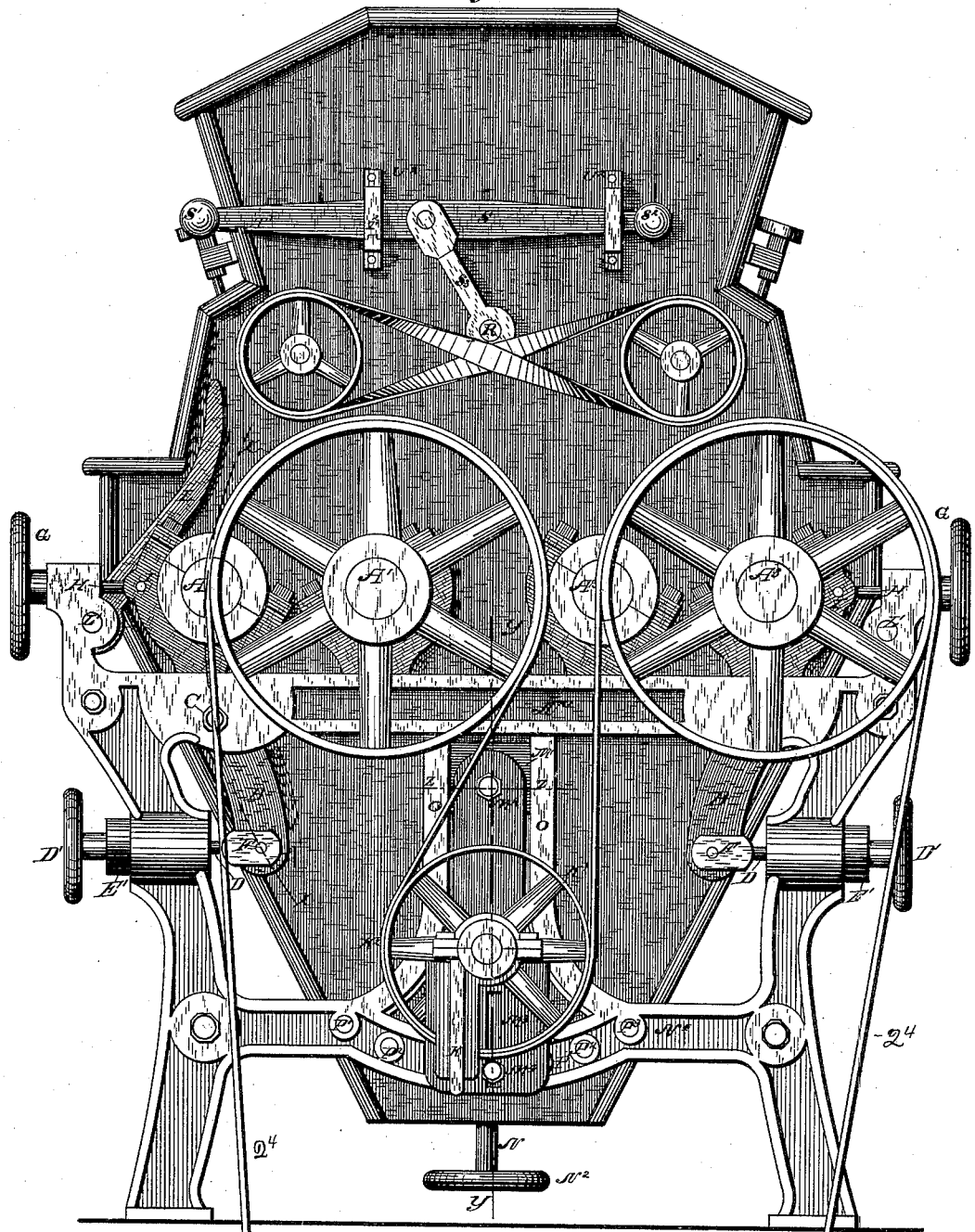

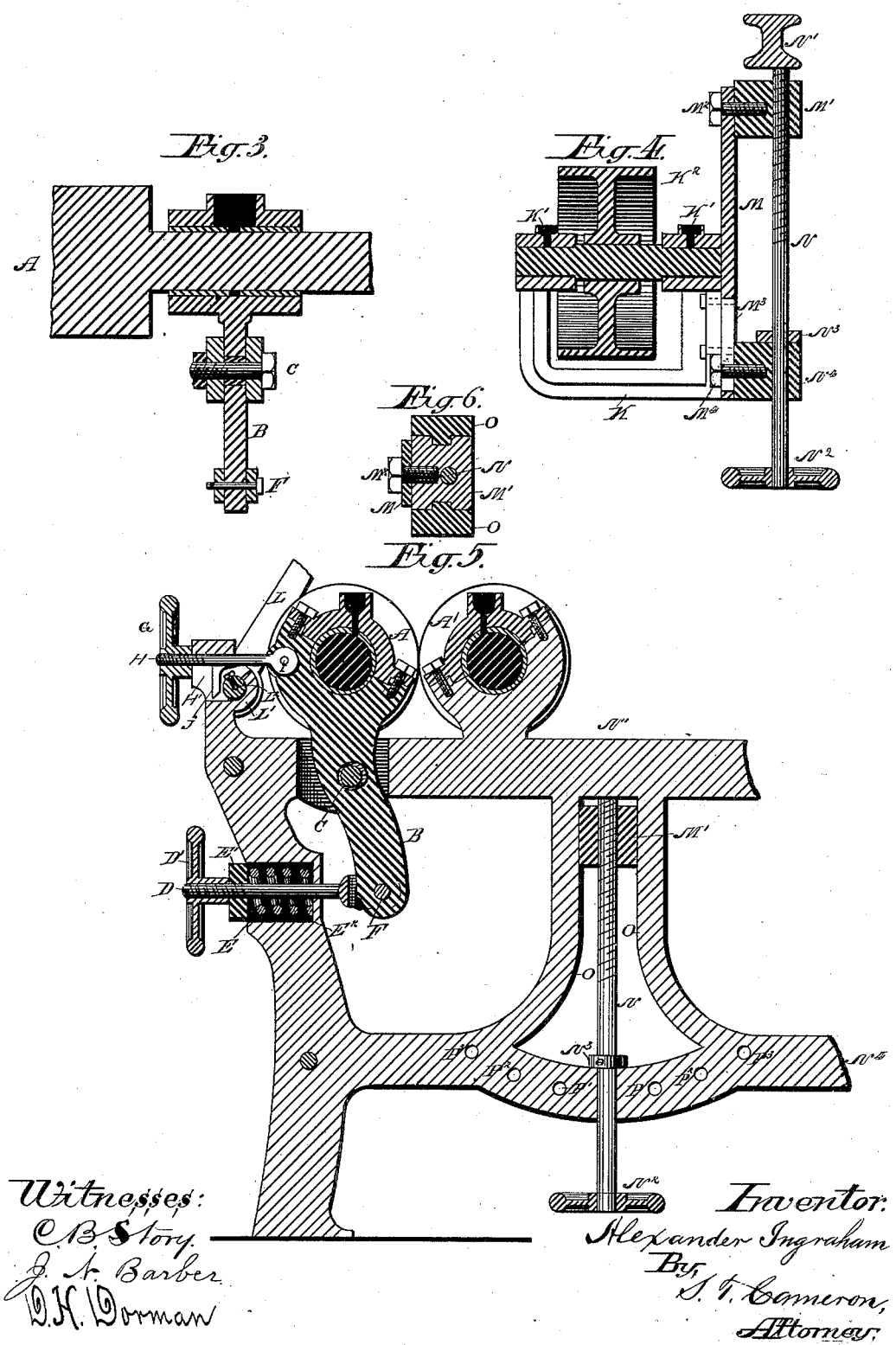

(No Model.) 4 Sheets—Sheet 4.

A. INGRAHAM.
ROLLER MILL.

No. 301,240. Patented July 1, 1884.

Witnesses:
C. B. Story.
J. N. Barber.
D. H. Dorman.

Inventor:
Alexander Ingraham
By S. T. Cameron
Attorney.

UNITED STATES PATENT OFFICE.

ALEXANDER INGRAHAM, OF MINNEAPOLIS, MINNESOTA.

ROLLER-MILL.

SPECIFICATION forming part of Letters Patent No. 301,240, dated July 1, 1884.

Application filed February 2, 1884. (No model.)

*To all whom it may concern:*

Be it known that I, ALEXANDER INGRAHAM, a subject of the Queen of Great Britain, residing at Minneapolis, in the county of Hennepin and State of Minnesota, have invented certain new and useful Improvements in Roller-Mills; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of mills in which horizontal grinding-rollers arranged in pairs are employed; and it consists in certain improvements in the construction and arrangement of parts in said mills, whereby they are rendered more accurate and certain in their operation, convenient in their adjustments, and more satisfactory results are obtained, as will be hereinafter more fully set forth.

Referring to the accompanying drawings, similar letters of reference indicate similar parts.

Figure 7:
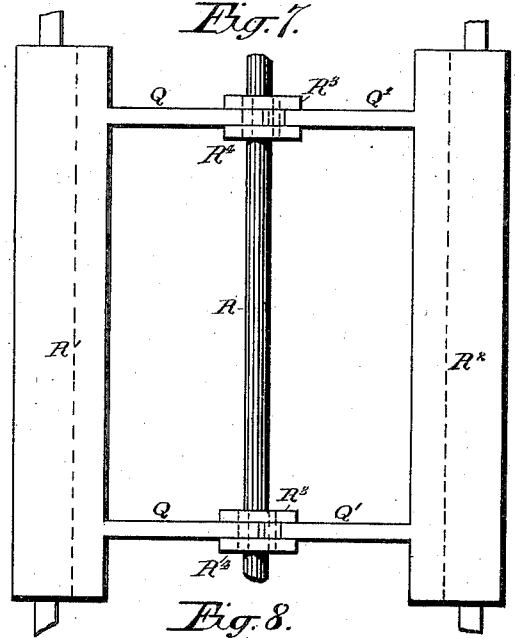
Figure 8:
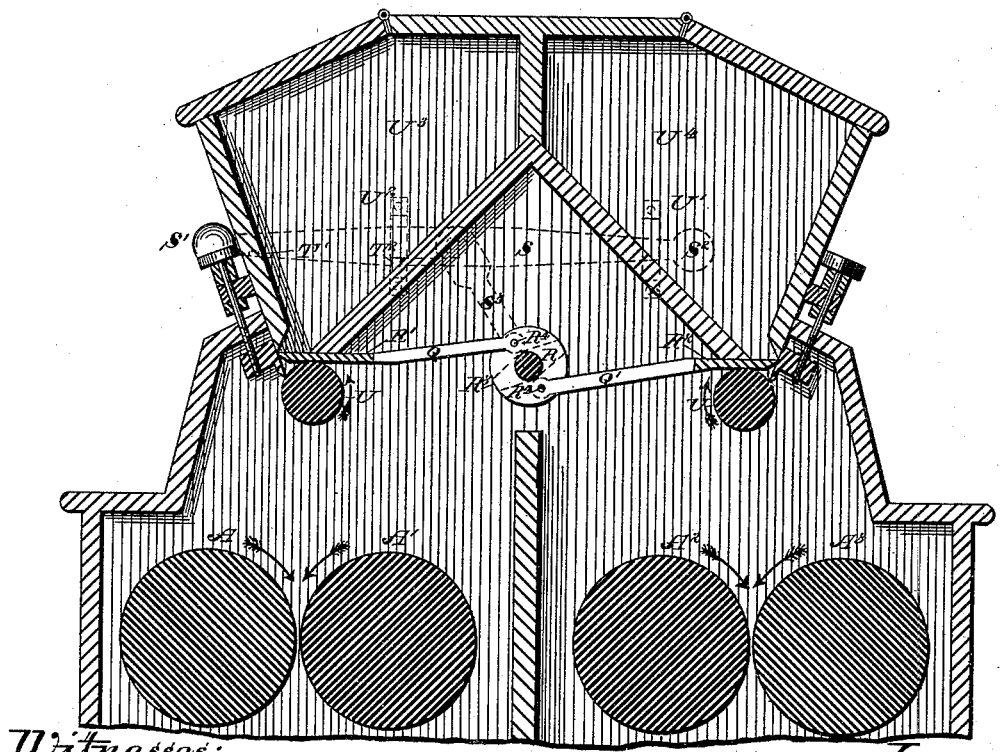

Figure 1 is a side elevation, and Fig. 2 an end elevation, of a machine embodying my invention. Fig. 3 is a vertical section on the dotted line X X of Fig. 2. Fig. 4 is a vertical section on the dotted line Y Y of Fig. 2. Fig. 5 is a vertical section on the dotted line W W of Fig. 1. Fig. 6 is a horizontal section on the dotted line Z Z of Fig. 2. Fig. 7 is an enlarged top view, with the wood-work removed, of feed-gates shown in Fig. 8. Fig. 8 is a vertical section of the upper portion of the machine on dotted line V V of Fig. 1.

A A' A² A³ are rollers by which wheat and other substances are ground.

A' and A² are rollers in stationary bearings, and A and A³ are rollers mounted on movable bearings, whereby they are adjusted to their fellow rollers.

B is an arm with bearing therein, this arm being mounted on the pivot C.

C is an eccentric whereby arm B is moved upward or downward to adjust roller A parallel to roller A', the roller A³ being adjusted to and from roller A² in the same manner.

D is a rod having a screw-thread at the outer end, and is connected to arm B by pivot F. Rod D has a hand-wheel, D', and is encircled by spiral spring, E, with a follower, E'.

E² is a cavity in the frame of the machine, containing spring E.

H is a rod having a screw-thread at the outer end, and fastened to the upper portion of arm B by means of the pivot I.

G is a hand-wheel working on, and *j* is an arm projecting downward from, rod H.

H' is a cavity in the frame of the machine, in which plays the projecting arm *j*.

L is a lever fastened to through-shaft L' by means of a set-screw.

L² is a screw-bolt screwed into through-shaft L', this bolt having a projecting head.

By screwing up the hand-wheel D' a pressure is brought to bear on the follower E', which compresses the spiral spring E, and thereby draws the lower end of the arm B toward the outer portion of the frame-work of the machine, thus throwing the movable roller A toward stationary roller A.

By means of the hand-wheel G operating on the rod H the movable roller A may be adjusted to the stationary roller A', so as to grind coarse or fine, as may be desired. By screwing up the hand-wheel G the roller A will be drawn back from roller A', and by loosening the hand-wheel the roller A (owing to the pressure exerted by spring E) will immediately approach the stationary roller A'.

By means of the spring E all slack consequent upon the wearing of the pivots F, C, and I is obviated, and the roller A is kept as near roller A' as will be permitted by the restraining-rod H. Upon throwing the lever L outward, the projecting head of the screw-bolt L² presses against the arm *j*, and thereby throws the rod H outward, carrying with it the adjustable roller A. In case the machine should become clogged, the feed-gate can be shut off, the lever L thrown outward, and all matter clogging the rollers would thus be permitted to pass through. Upon throwing the lever in again and opening the feed-gate the mill would at once be in operation, grinding the grain to the same degree of fineness as before, and without any new adjustment.

K is an iron frame supporting the bearings K' K', in which run the shafts of the tightening-pulleys $K^2$.

M is a plate of iron or other substance bolted to the block M' (M' being composed of iron or other substance) by means of the screw-bolt $M^2$, on which bolt plate M swings as on a pivot.

$M^3$ is a slot in plate M.

$M^4$ is a screw-bolt passing through slot $M^3$, and securing plate M to the frame of the machine $N^4$. Frame K is securely bolted to plate M.

N is a rod passing through the frame of the machine at $N^4$, and bearing against another portion of the frame at N'.

$N^2$ is a hand-wheel for operating rod N, and $N^3$ is a collar fastened to rod N immediately above the frame, at $N^4$, by means of a set-screw. Rod N has a screw-thread on the upper portion, by means of which thread the block M' is moved up or down.

O O are portions of the frame, having rectangular ribs on the inner sides, the block M' having slots in either side, into which the ribs on O O fit. (See Fig. 6.)

P' $P^2$ $P^3$ are holes in frame $N^4$ similar to and for the same purpose as the hole into which bolt $M^4$ fits.

When it is desired to tighten the belting $Q^4$, the rod N is turned by means of hand-wheel $N^2$ from left to right, thus forcing block M' downward, carrying with it the plate M, (slot $M^3$ playing on bolt $M^4$,) and consequently lowering frame K and tightening-pulley $K^2$, thereby taking up any slack there may be in the belt. Should it be desired to move the tightening-pulley $K^2$ to left or to right, to adjust the machine to the position of the driving-shaft, it may be accomplished by removing bolt $M^4$, swinging plate M on pivot $M^2$ until slot $M^3$ is opposite hole P', $P^2$, or $P^3$, as the case may be, and bolting the plate M to the frame $N^4$ at any one of the points by placing bolt $M^4$ through the slot $M^3$ and into hole P', $P^2$, or $P^3$, as may be desired.

R is a through-shaft.

$R^3$ are collars around shaft R, and fastened thereto by set-screws.

R' and $R^2$ are gates having arms Q Q and Q' Q', fastened to collar $R^3$ by means of pivots $R^4$ in the position shown in Figs. 7 and 8.

S is a bar or arm sliding in guides U' and $U^2$, and having heavy knobs or balls S' and $S^2$ at either end, S' being heavier than $S^2$.

$S^3$ is a lever fastened by set-screw to through-shaft R and to the center of arm S by a pivot.

T' and $T^2$ are notches in arm S, with corresponding catch in guide $U^2$.

U U are feed-rollers moving in the direction indicated by arrows.

By grasping ball S' and pulling it outward the feed-gates R' and $R^2$ will both be thrown outward in the position shown in Fig. 8, the extra weight of S' over $S^2$ causing notch $T^2$ to fall over the corresponding catch in guide $U^2$, thus preventing the gates from being moved out of this position by the jarring of the machinery or otherwise. Again, by grasping ball S' and pushing it inward the feed-gates R' and $R^2$ will be thrown inward, the notch T' will fall on the catch in guide $U^2$, and the gates will be held in position as indicated above, and the grain will fall from the feed-hoppers $U^3$ and $U^4$ onto the feed-rollers U U.

In case the grinding-rollers A A' $A^2$ $A^3$ become clogged, or in any way fail to perform their work, the feed may be instantly shut off from both sets of grinding-rollers with but one motion of the hand.

It will be readily understood from the drawings that the two ends of the machine are counterparts each of the other; that the movable rollers—one at each side of the mill—are each sustained by two pivoted arms—one at each end—and while but a single bar is necessary to cut off the grain-feed or to throw one of the rolls out of grinding position, the general construction of the mill is by a duplication of parts.

I claim as my invention—

1. In a roller-mill, the roll A', stationary bearings therefor, the movable roll, pivoted bearing-arms therefor, the eccentric pivots, rods D, pivoted to said arms below the eccentric pivots, the springs which draw said rods outwardly toward the frame, and the screw-threaded rods H, pivoted to arms B above the eccentric pivots, and provided with nuts G outside the frame, all combined and relatively arranged substantially as stated.

2. In a roller-mill, the roll A', fixed bearings therefor, the movable roll, pivoted arms B, the spring-pressed rods connected to the arms below their pivots, and extending outwardly through the frame, the screw-threaded rods H, pivoted to the arms above the arm-pivots, screw-nuts on rods H outside the frame, projections from rods H, and cams operating against said projections, all combined substantially as described.

3. In combination with the belt and pulleys of a roller-mill arranged as described, the vertically-adjustable block M', the slotted plate M, pivoted thereto, the screw-rod N, the frame K and its idler-pulley, the perforated frame, and the adjusting-bolt, whereby plate M may be secured in adjusted position, substantially as described.

4. The combination, with the hoppers of the through-shaft R, collars on said shaft, the gates, connecting-arms, eccentrically-arranged pivots on said collars, and an operating-lever, whereby said shaft may be rocked, all substantially as described.

5. The combination, with the hoppers, of the through-shaft, having collars fixed thereon provided with eccentrally-arranged pivots, the gates, the connecting-arms, the lever whereby said shaft is rocked, and a weighted slide-bar pivoted to said lever, substantially as described.

In witness whereof I have hereunto set my hand and seal, at Minneapolis, Minnesota, this 5th day of January, A. D. 1884.

ALEXANDER INGRAHAM. [L. S.]

In presence of—
 S. T. CAMERON,
 JOHN N. BARBER.